Dec. 30, 1958  J. E. CANDLIN, JR  2,866,419
FREIGHT VEHICLE PARTITION
Filed May 28, 1953  5 Sheets-Sheet 2
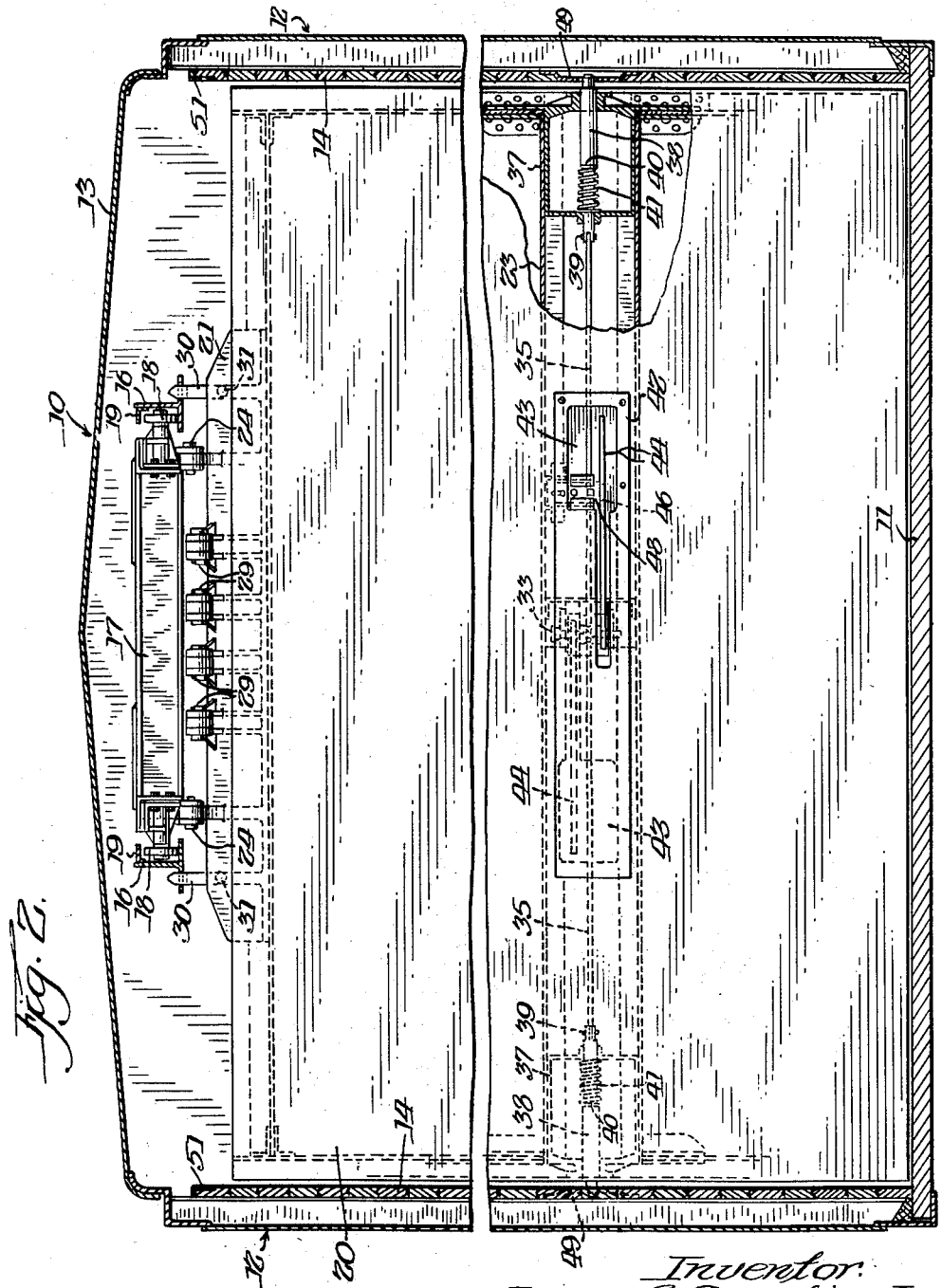
Inventor:
James E. Candlin, Jr.
By Wayne Morris Russell
Atty.

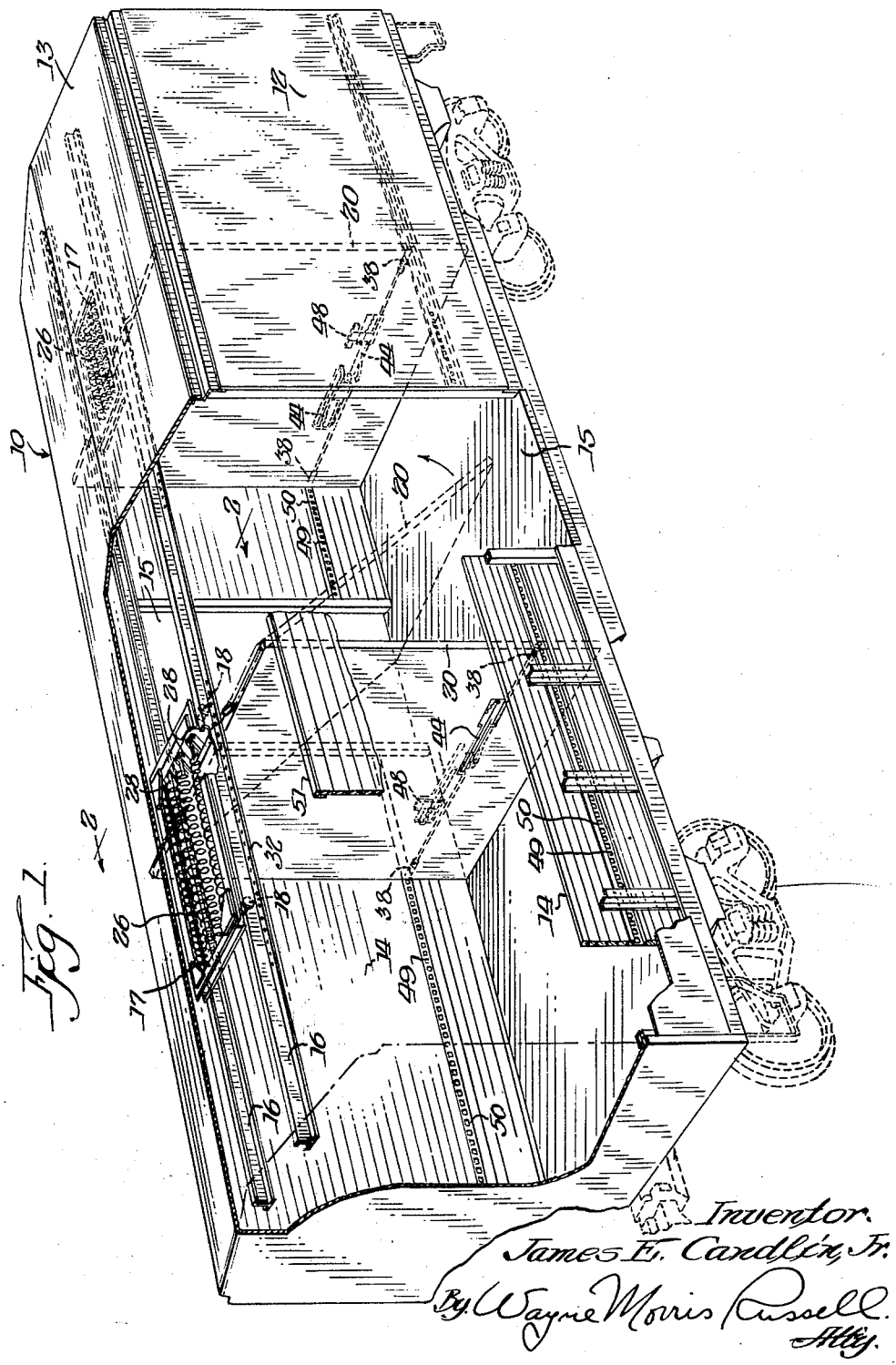

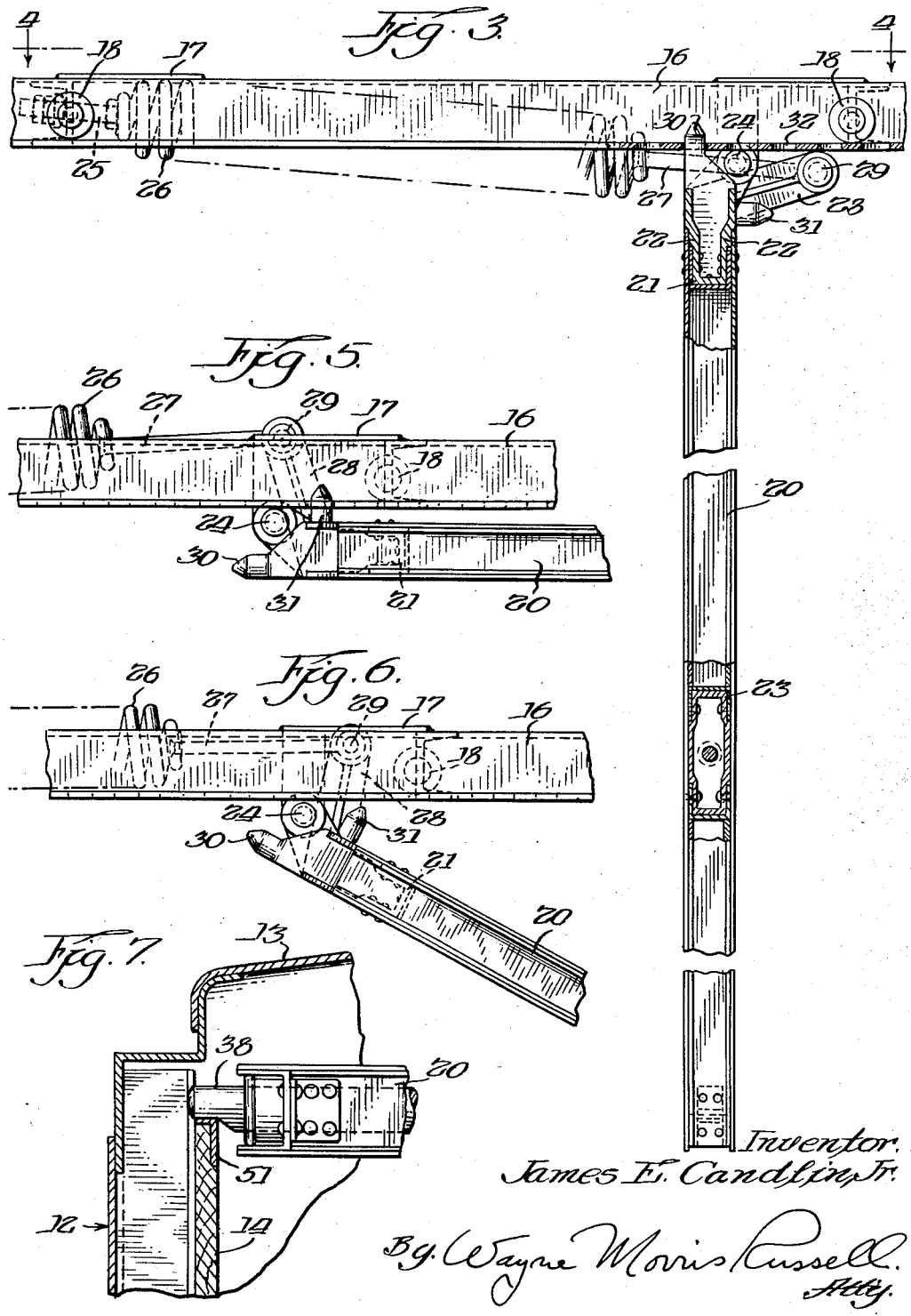

Dec. 30, 1958 J. E. CANDLIN, JR 2,866,419
FREIGHT VEHICLE PARTITION
Filed May 28, 1953 5 Sheets-Sheet 4
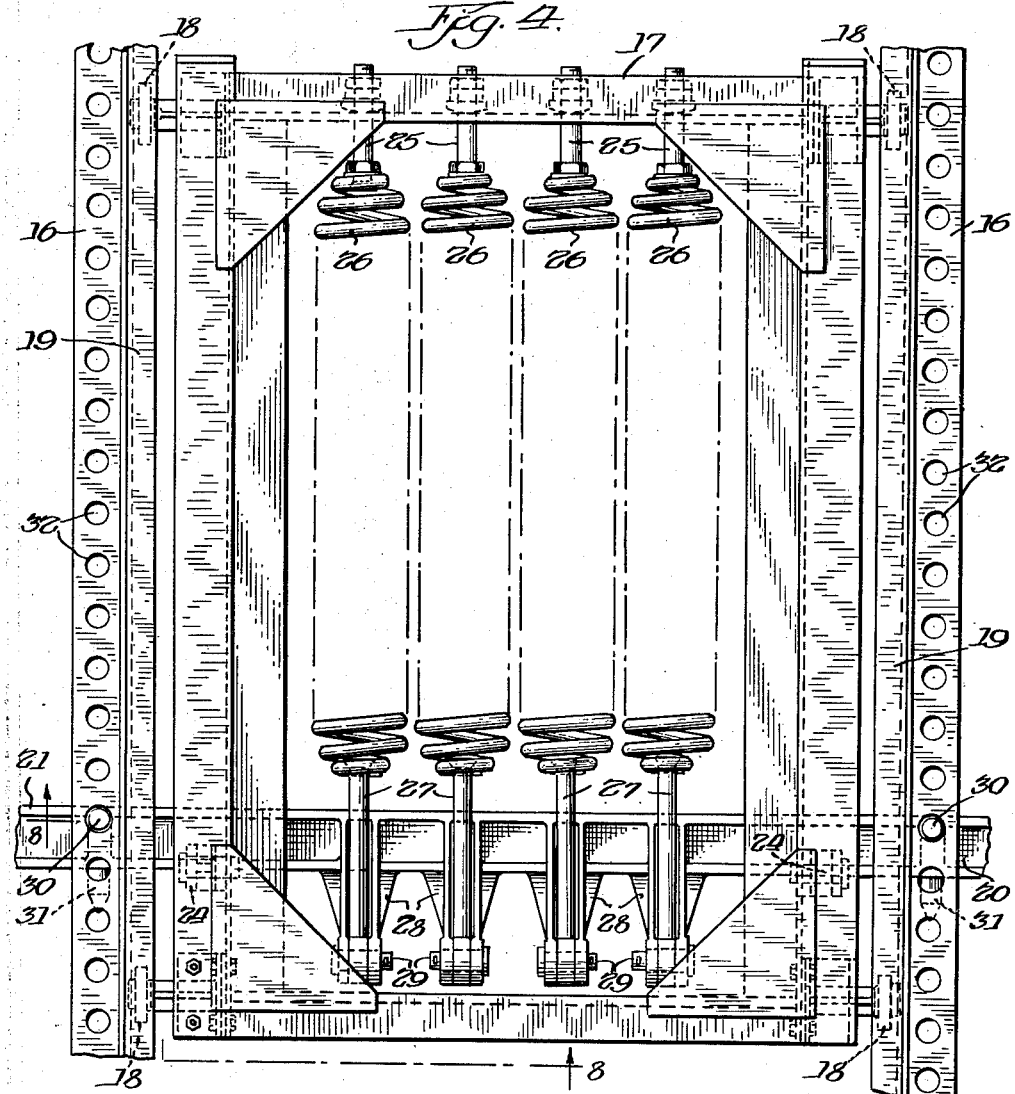
Inventor:
James E. Candlin, Jr.
By Wayne Morris Russell
Atty.

Dec. 30, 1958     J. E. CANDLIN, JR     2,866,419
FREIGHT VEHICLE PARTITION
Filed May 28, 1953     5 Sheets-Sheet 5
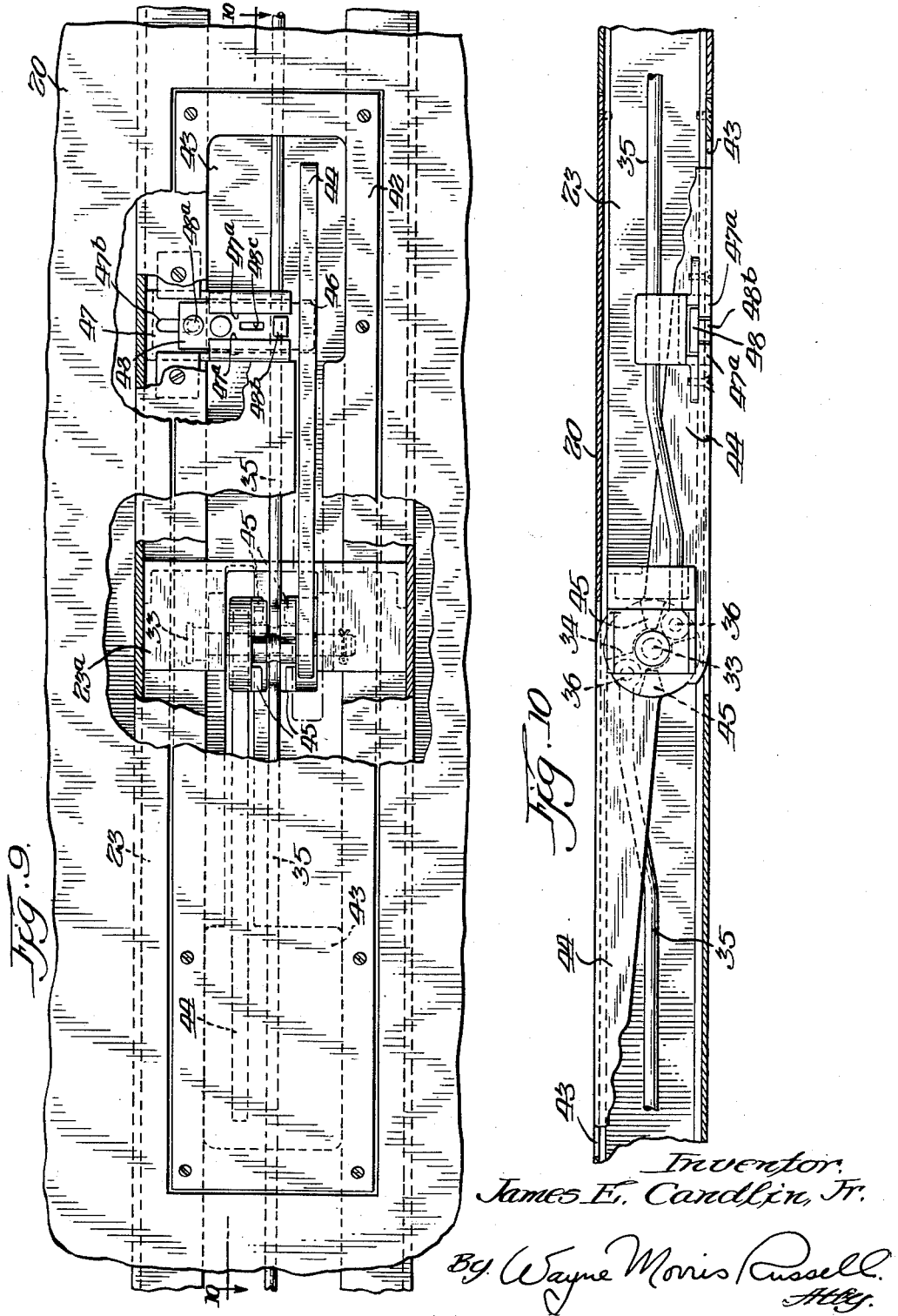
Inventor:
James E. Candlin, Jr.
By Wayne Morris Russell
Atty.

United States Patent Office 2,866,419
Patented Dec. 30, 1958

2,866,419

FREIGHT VEHICLE PARTITION

James E. Candlin, Jr., Hammond, Ind., assignor to Pullman-Standard Car Manufacturing Company, Chicago, Ill., a corporation of Delaware Application May 28, 1953, Serial No. 357,991

17 Claims. (Cl. 105—376)

This invention relates to freight vehicles and is primarily concerned with a movable partition for such vehicles.

The principal object of the invention is to provide a partition which is adapted to be disposed in a vertical position in the vehicle and extend transversely thereof to separate different kinds of lading or lading going to different destinations when in use and which is stowable in an overhead position when not in use.

Another object of the invention is to provide a partition which has resilient means connected to it which is adapted to counterbalance the partition for upward movement from the vertical position to a stowed position beneath the roof of the vehicle.

An important object of the invention is to provide a partition which in a position intermediate the vertical and stowed positions is movable longitudinally of the vehicle.

A more specific object of the invention is to provide a partition arrangement for a freight vehicle including a pair of tracks extending longitudinally of the vehicle and supported from the roof and a carriage movably mounted on the tracks—the partition and springs connected between the carriage and the partition having one end pivotally connected to the carriage and anchor lugs on the partition at said end and latch mechanism adjacent the other end the lugs engaging the tracks and the latch mechanism engaging the side walls of the car to hold the partition in a vertical position and the springs being adapted to counterbalance the partition for movement from a vertical position upwardly to a stowed position beneath the tracks and the lugs engaging the tracks and the latch mechanism engaging the side walls of the car to hold the partition in the stowed position against displacement longitudinally or vertically.

A further object of the invention is to provide a novel type of latch mechanism carried by the partition which is engageable with the vehicle body to aid in holding the partition in the vertical and stowed positions.

A further object of the invention is to provide a latch mechanism carried by the partition which has handles accessible from opposite faces of the partition and either of the handles adapted to actuate the latch mechanism independently of the other.

The foregoing and other objects of the invention are attained by the construction and arrangement illustrated in the accompanying drawings wherein:

Fig. 1 is a perspective view of a railway box car partially broken away to expose the partition and its carriage and associated tracks and showing the partition in a vertical position extending transversely of the car in solid lines and in an intermediate position in dotted lines;

Fig. 2 is a broken cross sectional view through the car taken on the line 2—2 of Figure 1 and showing the partition in a vertical position with the anchor lugs on the partition engaged in the tracks and the locking lugs on the partition engaging members in the side walls to prevent movement of the partition longitudinally of the car;

Fig. 3 is a side elevational view of the tracks and carriage with the partition shown in cross section and showing one of the anchor lugs on the partition engaged in the adjacent track to prevent movement of the upper end of the partition longitudinally of the car;

Fig. 4 is a top plan view of the carriage and tracks with the partition in vertical position taken on the line 4—4 of Fig. 3 and particularly showing the coil springs which help to swing the partition from a vertical position to a substantially horizontal or stowed position beneath the tracks;

Fig. 5 is a fragmentary side elevational view of the carriage and tracks and partition showing the partition in the substantially horizontal or stowed position with one of its anchor lugs engaged with the track to prevent movement of the partition longitudinally of the car;

Fig. 6 is a fragmentary side elevational view of the carriage and tracks and partition showing the partition in the intermediate position with its lugs spaced from the track so that the partition can be moved longitudinally of the car;

Fig. 7 is a cross sectional view through the joint between one of the side walls and the roof and showing the partition in a stowed position with one of the locking lugs on the partition resting upon the angle on the top of the inside lining to prevent downward movement of the rear end of the partition, Fig. 8 is a fragmentary view of the carriage and tracks and partition taken on the line 8—8 of Figure 4;

Fig. 9 is an elevational view of the latch mechanism adjacent the lower end of the partition showing the handles accessible from opposite faces of the partition each of which is effective to operate the latch mechanism independently of the other; and Fig. 10 is a cross sectional view taken on the line 10—10 of Figure 9.

The invention proposes a movable partition for freight vehicles and is disclosed as applied to a railway box car. A pair of tracks extend longitudinally of the car and are supported from the roof and each track is provided with spaced openings. A carriage having wheels is mounted upon and adapted to roll on the tracks. A partition has one end pivotally connected to the carriage and has projecting anchor lugs which engage the openings in the tracks. A latch mechanism is carried by the partition adjacent its other end and has retractible locking lugs which are adapted to project from opposite sides of the partition and engage apertures in members in the side walls of the car. The latch mechanism includes a pair of handles which are accessible from opposite faces of the partition each adapted to actuate the latch mechanism independently of the other. The anchor lugs engaging the openings in the tracks and the locking lugs of the latch mechanism engaging the apertures in the side walls are adapted to hold the partition in a vertical position in which it extends transversely of the car. A plurality of springs are connected to the carriage and the partition and upon disengagement of the locking lugs from the side walls these springs exert a force to help swing the partition upwardly from the vertical position to a stowed position beneath the tracks. The partition also has anchor lugs projecting from one face thereof which engage the openings in the tracks in the stowed position of the partition. The last named lugs engage the openings in the tracks and the locking lugs of the latch mechanism rest upon the top of the inside lining on the side walls of the car to hold the partition in a stowed position. In a position intermediate the vertical and stowed positions all of the lugs on the partition are spaced from the tracks so that the partition and its carriage can be moved longitudinally of the car.

In the drawings, 10 generally designates a railway box car having the usual trucks, side sills, a floor 11 disposed upon the side sills, side walls 12, side plates, end walls, and a roof 13. Each side wall has the usual outer sheathing secured to the respective side sill and side plate and corner posts and side posts and door posts which are secured to the side sill and side plate. Each side wall has inside lining made up of horizontally disposed wooden boards 14 beginning from the floor upwardly to a location spaced below the web of the side plate and each side wall has a door opening 15 midway of the length of the car.

A pair of spaced inverted T-shaped tracks 16 are positioned centrally of the roof and extend substantially the full length of the car. Spaced brackets are secured to the usual carlines in the roof, neither the brackets nor the carlines being shown in the drawings, and these brackets are secured to the tracks 16 to support the tracks from the roof. A carriage or rectangular-shaped frame 17 is positioned between the tracks 16 and this frame is made up of two spaced Z-members for its sides and two shorter spaced channels for its ends and the channels are secured to the Z-members and gusset plates are disposed on top of the frame and are welded to each corner of the frame. A pair of spaced wheels 18 are mounted on each side of the frame adjacent each end and the housing supporting each wheel is bolted to the Z-members which make up the sides of the frame. Each pair of wheels 18 is adapted to roll upon the inner flange of the respective track and an L-shaped angle 19 has one flange welded to the vertical leg of the track and its other flange projects toward the opposite track so as to overly the adjacent pair of wheels and thereby prevent any upward movement of the frame. A partition 20 extends across the width of the car. The partition 20 is made up of a channel at its top and a channel 21 having long legs 22 seated in the first-named channel and has a channel at its bottom and channels along its sides and a metal housing formed by opposed channel members 23 extends transversely adjacent the lower end of the partition, and a pair of metal sheets are positioned on opposite sides of all of the channels and the housing. All of the channels are secured together at their points of intersection and the channels and the housing 23 are secured to the metal sheets. The partition is pivotally connected at one end to the carriage or frame 24 as best shown in Figure 2.

A plurality of bolts 25 extend through the web of the channel at the other end of the frame 17 and these bolts have the usual nuts and locknuts threaded on their ends and bearing against the web of the channel. A plurality of coil springs 26 equal to the number of bolts are provided and each has one of its ends engaged upon the head of one of the bolts. A plurality of connecting members 27 equal to the number of springs 26 are provided and each has its headed end engaged with the other end of one of the springs. A plurality of arms 28 equal to the number of members 27 are positioned between the points of pivotal connection of the partition 20 to the frame 17 and each arm has one end integral with the channel 21 on the partition. The arms 28 are arranged at an angle with respect to a plane through the partition, this angle being about 65 degrees clockwise from a plane through the partition as viewed in Figure 3, and the arms project away from the partition. The other ends of the members 27 are disposed between the bifurcated ends of the arms 28, and pins 29 extend through the arms and the members 27 to pivotally connect the arms to the members 27. Broadly speaking, a first pair of spaced anchor lugs 30 project from the upper end of the partition; more specifically, each lug is disposed adjacent an end of the channel 21 and is made integral with the channel and both lugs lie in a plane through the partition, all as best shown in Figures 2 and 3. A second pair of spaced anchor lugs 31 are positioned adjacent the upper end of the partition 20 and are arranged at right angles with respect to a plane through the partition and project away from one face of the partition; more specifically, each lug 31 is disposed adjacent one of the lugs 30 and is made integral with the channel 21. The outer ange of each track 16 is provided with a plurality of opening 32 which are spaced along the entire length of the track and the pairs of lugs 30 and 31 are adapted to project into these openings.

A pin 33 is positioned interiorly of and disposed longitudinally of the partition and more specifically is mounted in the housing 23 centrally thereof in a central bracket member 23ᵃ secured between the opposed channels 23. A rotary element 34 made up of a collar and wings disposed on opposite sides of and integral with the collar is pivotally mounted on the pin 33, as best shown in Figure 10. A pair of links 35 are positioned in the housing 23 and each has one end pivotally connected to the opposite ends of the element 34 or to the wings as at 36. End closure castings 37 are positioned in the housing at its ends and are secured between the channels 23 and each has aligned holes in its ends. A retractible locking lug 38 is positioned in each casting 37 and projects through and beyond the aligned holes in the respective castings and each lug has one end pivotally connected to the adjacent end of the link 35 as at 39. Each lug 38 has a reduced portion which forms a shoulder 40 intermediate the ends of the lug, and a coil spring 41 has one end bearing against the respective casting 37 and its other end bearing against the shoulder to urge the lug outwardly of the partition 20.

Plates 42 are secured to the opposite faces of the partition 20 and each plate has an opening 43 therein. A pair of handles 44 is disposed in the housing 23 and one of the handles is accessible from one face of the partition through one of the openings 43 and the other handle is accessible from the opposite face of the partition through the other opening 43. Each handle 44 has one end rounded with a pair of spaced opposed bosses 45 thereon in cooperative relation to the respective wings on the rotary element 34 and the rounded end is pivotally mounted on the pin 33. One of the handles 44 is positioned on the upper side of the rotary element 34 while the other handle is positioned on the lower side of the element. The bosses 45 on either handle 44 are adapted to engage the respective wings of the element 34, as shown in Figure 10, to move both of the locking lugs 38 inwardly of the partition 20 simultaneously. The handle 44 at the side of the partition adjacent the door openings 15 has a slot 46 intermediate its ends and a bracket 47 is secured to the housing 23 and has vertically extending guideways 47ᵃ and a vertical slot 47ᵇ. A plate 48 having a stud 48ᵃ fixed thereto is slidably mounted in the guideways and the stud rides in the slot 47ᵇ. A guide lug 48ᵇ on the sliding plate is operable between the guideways 47ᵃ. The plate is adapted to fall into the slot 46 in the operating handle by gravity when the partition is in a vertical position to lock the handle. Aligned slots 48ᶜ in the plate 48 and guide bracket 47 are provided for insertion of a seal in the locked position of the parts to prevent unauthorized manipulation of the mechanism.

A pair of horizontally disposed elongated members 49 are mounted in the side walls 12 and spaced above the floor 11 and extend substantially the full length of the car at opposite sides of the door openings 15. The members 49 are disposed flush with the inside lining 14 and are secured to the side posts and door posts and corner posts. Each member 49 is provided with a plurality of apertures 50 which are spaced along the entire length of the member. A pair of horizontally disposed L-shaped angles 51 are positioned upon the tops of the inside lining on the side walls 12 and are secured thereto, and the angles extend across the door openings 15 and sufficient distances therebeyond to provide support for the partition in any location in the car in which it is capable of being stowed, as best indicated in Figure 1. The retractible locking lugs 38 are adapted to rest upon the angles 51 when the partition is in a substantially horizontal or stowed position beneath the tracks.

The mode of operation of the partition and its mechanism is as follows: Assuming that the partition 20 is in a vertical position extending transversely of the car as shown in Figure 1, the pair of anchor lugs 30 project through the adjacent openings 32 in the tracks 16, as best shown in Figures 2, 3 and 8, to prevent any movement of the upper end of the partition 20 longitudinally of the car, and the locking lugs 38 are urged into the adjacent apertures 50 in the side wall members 49 by the coil springs 41 to prevent any movement of the lower end of the partition longitudinally of the car. Thus, the anchor lugs 30 and the locking lugs 38 together prevent movement of the partition 20 longitudinally of the car when it is in a vertical operative position. To move the partition from the vertical position to a substantially horizontal or stowed position beneath the roof 13 and just below the tracks 16 the operator may use the handle nearest the door openings 15 after unlocking the gravity lock by moving the plate 48 upwardly out of the slot 46 in the handle. As stated, the handles 44 are swingable outwardly of and are accessible from opposite faces of the partition 20, and by swinging either handle in one direction the bosses 45 on that handle will engage the wings of the rotary element 34 and withdraw the locking lugs 38 from the apertures 50 in the members 49 against the force of the springs 41 to release the lower end of the partition. As soon as the lugs 38 are withdrawn from the apertures 50, the operator need only exert a very light force on one of the handles 44 to move the partition 20 upwardly a very slight angle and then the plurality of springs 26 will assist in swinging the partition upwardly into a substantially horizontal or stowed position just below the tracks 16. When the partition 20 is moved upwardly to the stowed position, the pair of anchor lugs 31 will project through the adjacent pair of openings 32 in the tracks 16, as best shown in Figure 5, to prevent movement of the partition longitudinally of the car, and the springs 41 will urge the lugs 38 outwardly of the partition where they are adapted to rest upon the angles 51, as best shown in Figure 7, to prevent downward movement of this end of the partition while in the stowed position. It will be apparent that the pivotal connections 24 will prevent downward movement of the other end of the partition when in the stowed position. In a position of the partition 20 intermediate the vertical and stowed positions such as is shown in dotted lines in Figure 1, both pairs of lugs 30 and 31 are spaced from the tracks 16, as best shown in Figure 6, allowing movement of the partition and its carriage 17 longitudinally of the car.

In Figure 1, two of the partitions are shown, thus dividing the car into three compartments, and this is the number required for normal use of the car. However, as many partitions as desired can be used or only one partition can be used depending upon the number of different kinds of lading or the number of different destinations of lading or both shipped to different consignees. The springs cause the partition to be perfectly counterbalanced and thus make the upward swinging of the partition into stowed position a one-man operation and relieves the operator of the necessity of lifting the partition. Four of these balancing springs are used so that in the event of a spring breakage the partition and its associated mechanism is still usable. The partition can be moved past the doors of the car and can be locked anywhere, either in vertical or stowed position, between the door post and the end of the car. The anchor lugs 31 cooperate with the retractible lugs 38 and locking mechanism to secure the partition in the stowed position.

The partition and its carriage can be moved longitudinally of the car only when in the intermediate position. If the partition is not locked by the operator, it will lock itself against movement when in vertical position when the car is bumped by another car. The partition is made entirely of metal and is light in weight and of such thickness as to occupy a minimum of the usable space in the car. In effect, all locking means on the partition can be released or engaged by the movement of or release of a single handle. Thus, to move the partition from a vertical position to a stowed position all that is necessary is to move one of the handles to withdraw the locking lugs from the apertures in the side wall members. And to move the partition from a stowed position to a vertical position, all that is necessary is to move one of the handles to move the lugs inwardly of the partition and off the supporting angles on the inside lining. When two partitions are used in a car each partition will always remain at its respective end of the car and therefore the handle with the gravity lock will always be nearest the door openings, and when the partition is swung upwardly to stowed position the gravity lock will be disposed adjacent the roof of the car and the other handle of the partition will be exposed on the under side and the operator can grasp this handle and draw the locking lugs 38 off the angles on the tops of the inside lining and move the partition to a vertical position without disturbing the other handle with the gravity lock since the rotary element 34 is operable by either handle independently of the other. When the partition is in stowed position and the gravity lock is disengaged from its handle, a sudden stopping of the car or a bumping of the car by another car will cause the slot in the handle and the gravity lock to come into engagement and thus lock the handle. However, this does not affect operation of the other handle because of the actuation of the rotor 34 free of the remaining handle when operated by either handle. Since there are no keepers in the floor, there are no weak or rough spots in the floor and there is no invitation to infestation in the floor by insects.

From the foregoing it will be seen that there has been provided a railway freight car partition which has counterbalancing means for swinging the partition upwardly from a vertical position to a stowed position and carries releasable lugs and latch mechanism to hold itself in either the vertical or stowed positions and is movable longitudinally of the car while in a position intermediate the vertical and stowed positions.

What is claimed is:

1. In a freight vehicle, a roof, a pair of spaced tracks positioned adjacent the roof and extending longitudinally of and secured to the vehicle, a frame positioned between the tracks, wheels mounted on opposite sides of the frame and adapted to roll on the tracks, a partition having one end pivotally connected to the frame adjacent to and spaced from one end thereof, a plurality of bolts each having one end secured to the other end of the frame, a plurality of springs each having one end secured to the other end of the respective bolt, a plurality of connecting members each having one end secured to the other end of the respective spring, and a plurality of arms each having one end secured to said one end of the partition and each having its other end pivotally connected to the other end of the respective connecting member.

2. In a freight vehicle, side walls having inside lining, a roof, a pair of tracks positioned adjacent the roof and extending longitudinally of and secured to the vehicle, a carriage mounted on the tracks, a partition having one end pivotally connected to the carriage, a pair of locking lugs movably mounted in the opposite sides of the partition and adapted to project from the sides of the partition, an angle disposed on the top of the inside lining of each side wall and secured thereto, the partition being adapted to swing upwardly to a stowed position beneath the tracks and each locking lug being adapted to rest upon its respective angle to hold the partition in the stowed position.

3. In a freight vehicle, side walls having inside lining, a roof, a pair of tracks positioned centrally of the roof and extending longitudinally of the vehicle and secured to the roof, a carriage movably mounted on the tracks, a partition having one end pivotally connected to the carriage, a pair of members spaced from the floor and extending longitudinally of the car and secured to the opposite side walls and each of the members being provided with spaced apertures, a pair of locking lugs movably mounted in the opposite sides of the partition adjacent the other end thereof, a handle carried by the partition and operatively connected to both of the locking lugs, and a plurality of springs connected to the carriage and the partition, the locking lugs being adapted to project into the apertures in the members when the partition is in a vertical position and movement of the handle in one direction withdrawing the locking lugs from the apertures and the springs urging the partition upwardly into a substantially horizontal position beneath the tracks and adjacent the roof and each locking lug being adapted to rest upon the top of the inside lining on each side wall to hold the partition in the substantially horizontal position.

4. In a freight vehicle, side walls having inside lining, a roof, a pair of tracks extending longitudinally of the vehicle and depending from the roof and provided with spaced openings, a carriage mounted on the tracks, a partition having one end pivotally connected to the carriage, a first pair of anchor lugs projecting from said one end of the partition, a second pair of anchor lugs projecting from one face of the partition adjacent said one end thereof, a pair of members extending longitudinally of the car and spaced above the floor and secured to the opposite side walls and provided with spaced apertures, a pair of locking lugs movably mounted in the opposite sides of the partition adjacent the other end thereof, a handle carried by the partition and operatively connected to both of the locking lugs for moving the locking lugs, the first pair of anchor lugs engaging the openings in the tracks and the locking lugs engaging the apertures in the members to hold the partition in a vertical position, a pair of angles disposed on the top of the inside lining on each side wall and secured to the respective lining, and a plurality of springs connected to the carriage and the partition, the springs urging the partition upwardly from the vertical position to a substantially horizontal position beneath the tracks and the second pair of anchor lugs engaging the openings in the tracks and the locking lugs resting upon the angles to hold the partition in a substantially horizontal position.

5. In a freight vehicle, a partition provided with recesses in its opposite faces, a pin positioned in the partition, an element positioned in the partition and pivotally mounted on the pin, a first locking lug positioned in the partition, a first link positioned in the partition and pivotally connected to the element and the first locking lug, a second locking lug positioned in the partition, a second link positioned in the partition and pivotally connected to the element and the second locking lug, a first handle having a pair of bosses on one end positioned in one recess and said one end being pivotally mounted on the pin on one side of the element, a second handle having a pair of bosses on one end positioned in the other recess and said last mentioned one end being pivotally mounted on the pin on the other side of the element, the first handle being accessible from one face of the partition through the one recess and the second handle being accessible from the other face of the partition through the other recess and the bosses on either handle being engaged with the element to actuate both of the locking lugs simultaneously.

6. In a freight vehicle, a partition provided with recesses in its opposite faces, a pin positioned in the partition parallel to said faces, a rotary collar element positioned in the partition and pivotally mounted on the pin, a first link positioned in the partition and having one end pivotally connected to one end of the element, a first locking lug positioned in the partition and having one end pivotally connected to the other end of the first link, a coil spring on the first locking lug urging the locking lug outwardly of the partition, a second link positioned in the partition and having one end pivotally connected to the other end of the element, a second locking lug positioned in the partition and having one end pivotally connected to the other end of the second link, a coil spring on the second locking lug urging the locking lug outwardly of the partition, a first handle having one end rounded and having a pair of spaced opposed bosses on the rounded end positioned in one of the recesses and the rounded end being pivotally mounted on the pin on one side of the element, a second handle having one end rounded and having a pair of spaced opposed bosses on the rounded end positioned in the other recess and the rounded end being pivotally mounted on the pin on the other side of the element, the first handle being accessible from one face of the partition through the one recess and the second handle being accessible from the other face of the partition through the other recess and the bosses on either handle being engaged with the element to rotate the element on the pin and thereby move both of the locking lugs inwardly of the partition simultaneously when either handle is swung outwardly from the respective recess and rotated about said pin.

7. In a freight vehicle, a partition, a pin positioned in the partition in a plane parallel to the opposite faces of the partition, a rotary collar element positioned in the partition and pivotally mounted on the pin, a first locking lug positioned in the partition, a first link positioned in the partition and pivotally connected to the element and the first locking lug, a second locking lug positioned in the partition, a second link positioned in the partition and pivotally connected to the element and the second locking lug, a handle having a pair of bosses on one end and said one end being pivotally mounted on the pin adjacent the element and the handle having a slot therein and the bosses on the handle being engaged with the element to actuate both of the locking lugs simultaneously, and a plate slidably mounted in the partition above the slot and free to fall into the slot by gravity when the partition is in a vertical position to lock the handle.

8. In a freight vehicle, end walls, a roof, track means positioned adjacent the roof and extending longitudinally of and secured to the vehicle, a carriage movably mounted on the track means, a partition disposed between the end walls, a pivot connecting the partition to the carriage, and resilient means connected to the carriage and the partition comprising an elongated coil tension spring having one end connected to one end portion of the carriage at a point on one side of said pivot and having its other end connected to the upper portion of the partition at a point on the opposite side of said pivot for urging the partition from a vertical in use position upwardly into a stowed out of use position adjacent the roof.

9. In a freight vehicle, end walls, a roof, a pair of tracks positioned adjacent the roof and extending longitudinally of and secured to the vehicle, a carriage movably mounted on the tracks, a partition disposed between the end walls, a pivot connecting one end of the partition to the carriage, and resilient means connected to the carriage and to said one end of the partition comprising an elongated coil tension spring having one end connected to one end portion of the carriage at a point on one side of said pivot and having its other end connected to the upper portion of the partition at a point on the opposite side of said pivot for urging the partition from a vertical in use position upwardly into a stowed out of use position adjacent the roof.

10. In a freight vehicle, a roof, track means positioned adjacent the roof and extending longitudinally of and secured to the vehicle, a partition movably supported from the track means, a first lug carried by the partition and projecting therefrom in the plane of the partition, a second lug carried by the partition and projecting therefrom in a plane perpendicular to the plane of the partition, and latching means carried by the partition and movable into selective engagement with spaced apart fixed portions of the vehicle; the first lug engaging the track means and the latching means engaging one of said fixed portions of the vehicle to hold the partition in a vertical position, and the second lug engaging the track means and the latching means engaging another of said fixed portions of the vehicle to hold the partition in a stowed position adjacent the roof.

11. In a freight vehicle, a roof, track means positioned adjacent the roof and extending longitudinally of and secured to the vehicle and provided with a series of longitudinally spaced apart openings, a partition movably supported from the track means, a first lug carried by the partition and projecting therefrom in the plane of the partition, a second lug carried by the partition and projecting therefrom in a plane perpendicular to the plane of the partition, and latching means carried by the partition and movable into selective engagement with spaced apart fixed portions of the vehicle; the first lug engaging a selected one of said openings in the track means and the latching means engaging one of said fixed portions of the vehicle to hold the partition in a vertical position, and the second lug engaging a selected one of said openings in the track means and the latching means engaging another of said fixed portions of the vehicle to hold the partition in a stowed position adjacent the roof.

12. In a freight vehicle, a roof, a pair of laterally spaced apart tracks positioned adjacent the roof and extending longitudinally of and secured to the vehicle, a partition movably supported from the tracks, a first pair of laterally spaced apart lugs carried by the partition and projecting therefrom in the plane of the partition, a second pair of laterally spaced apart lugs carried by the partition and projecting therefrom in a plane perpendicular to the plane of the partition, and latching means carried by the partition and movable into selective engagement with spaced apart fixed portions of the vehicle; the first pair of lugs engaging the tracks and the latching means engaging one of said fixed portions of the vehicle to hold the partition in a vertical position, and the second pair of lugs engaging the tracks and the latching means engaging another of said fixed portions of the vehicle to hold the partition in a stowed position adjacent the roof.

13. The combination claimed in claim 12, in which the partition has one end portion pivotally supported from the tracks and said first pair of lugs project from said end portion.

14. In a freight vehicle, a pair of side walls, a roof, a pair of tracks positioned adjacent the roof and extending longitudinally of and secured to the vehicle and provided with a series of longitudinally spaced apart openings, a carriage mounted on the tracks for movement along them, a partition having one end pivotally connected to the carriage for swinging movement between vertical and horizontal positions, resilient means connected to the carriage and the partition tending to urge the partition toward horizontal position, a first pair of lugs projecting from said one end of the partition in the plane of the partition and secured thereto, a second pair of lugs projecting from one face of the partition in a plane perpendicular to the plane of the partition and secured thereto, and latching means on the partition movable into latching engagement with vertically spaced apart portions of the side walls; the first pair of lugs engaging a selected pair of openings in the tracks and the latching means engaging the lower of said spaced apart portions of the side walls to hold the partition in a vertical in use position, and the second pair of lugs engaging a selected pair of openings in the tracks and the latching means engaging the higher of said spaced apart portions of the side walls to hold the partition in a horizontal stowed position.

15. In a freight vehicle, a roof, a pair of tracks positioned adjacent the roof and longitudinally of and secured to the vehicle, a partition pivotally supported from the tracks for movement between vertical and horizontal positions, a first pair of lugs carried by the partition and projecting therefrom in the plane of the partition and engageable with the tracks when the partition is in vertical position, and latching means carried by the partition and movable into selective engagement with spaced apart fixed portions of the vehicle; the first pair of lugs engaging the tracks and the latching means engaging one of said fixed portions of the vehicle to hold the partition in a vertical position, and the second pair of lugs engaging the tracks and the latching means engaging another of said fixed portions of the vehicle to hold the partition in a horizontal stowed position adjacent the roof, and the two pairs of lugs being of such length and spacing that in a position of the partition intermediate the vertical and horizontal positions both pairs of lugs are spaced from the tracks, thereby freeing the carriage and partition for movement longitudinally of the vehicle.

16. In a freight vehicle, a roof, a pair of spaced tracks positioned adjacent the roof and extending longitudinally of and secured to the vehicle, a frame positioned between the tracks and movably supported on the tracks, a partition having one end pivotally connected to the frame adjacent to and spaced from one end of the frame and having one surface facing the other end of the frame, a plurality of springs disposed inside the frame and each having one end secured to said other end of the frame, a plurality of arms each having one end secured to said one end of the partition and projecting therefrom, and a plurality of connecting members each having one end secured to the other end of the respective spring and its other end pivotally connected to the other end of the respective arm, the springs urging the partition to swing upwardly and away from said other end of the frame by movement about said pivotal connection.

17. In a freight vehicle, a floor, side walls, a roof, track means supported from the roof and extending longitudinally of the vehicle, a carriage mounted on the track means for movement therealong, a partition pivotally connected to the carriage for movement between lowered vertical and raised horizontal positions and provided with recesses in its opposite faces, locking lugs on the partition, means for projecting said lugs from opposite edges of the partition into engagement with certain portions of the side walls in a vertical position of the partition to help maintain the partition in that position and into engagement with other portions of the side walls in a horizontal position of the partition adjacent the roof to help maintain the partition in that position, a first handle positioned in one of said recesses and operatively connected to the locking lugs to actuate them and being provided with a slot, a second handle positioned in the other recess and operatively connected to the locking lugs to actuate them, and a plate mounted in the partition and movable by gravity into the slot in the first handle when the partition is in a vertical position to lock the handle.

References Cited in the file of this patent

UNITED STATES PATENTS

| 583,321 | Blue | May 25, 1897 |
|---|---|---|
| 1,224,130 | Bohn | May 1, 1917 |
| 2,160,870 | Jones | June 6, 1939 |
| 2,220,436 | Ziegler | Nov. 5, 1940 |
| 2,301,866 | Goodall | Nov. 10, 1942 |
| 2,484,512 | Ingram | Oct. 11, 1949 |